G. F. ZAUN.
TRUCK.
APPLICATION FILED MAY 20, 1918.

1,297,290.

Patented Mar. 11, 1919.
5 SHEETS—SHEET 3.

Witnesses

Inventor
G. F. Zaun,
By Victor J. Evans
Attorney

G. F. ZAUN.
TRUCK.
APPLICATION FILED MAY 20, 1918.

1,297,290.

Patented Mar. 11, 1919.
5 SHEETS—SHEET 5.

Witnesses

Inventor
G. F. Zaun,
By Victor J. Evans
Attorney

UNITED STATES PATENT OFFICE.

GEORGE F. ZAUN, OF SAN BERNARDINO, CALIFORNIA.

TRUCK.

1,297,290. Specification of Letters Patent. Patented Mar. 11, 1919.

Application filed May 20, 1918. Serial No. 235,514.

*To all whom it may concern:*

Be it known that I, GEORGE F. ZAUN, a citizen of the United States, residing at San Bernardino, in the county of San Bernardino and State of California, have invented new and useful Improvements in Trucks, of which the following is a specification.

This invention relates to improvements in baggage trucks and has among its objects to produce a wheeled truck provided with means whereby a platform thereon may be raised or lowered as when delivering goods to a car or receiving goods therefrom; to provide means whereby the truck is suitably braced and reinforced so as to properly support loads at any or at all portions thereof; to provide means for effectively locking the platform when the same is either raised or lowered; to provide means whereby articles can be conveniently arranged on the platform of the truck and easily moved to any part thereof; to provide means for preventing articles falling off the truck from either the sides or ends thereof; to provide a construction whereby the platform may be raised or lowered with a minimum amount of physical exertion regardless of the weight disposed on said platform; to provide a movable platform which may be arranged upon any of the ordinary trucks now on the market, and in general to produce a device of this kind which, while of a simple nature and easily operated construction, will be thoroughly efficient for the purposes devised.

I accomplish the foregoing objects and others by a construction, combination and operative arrangement of parts, a simple and satisfactory embodiment of which being illustrated by the accompanying drawings.

Figure 1:
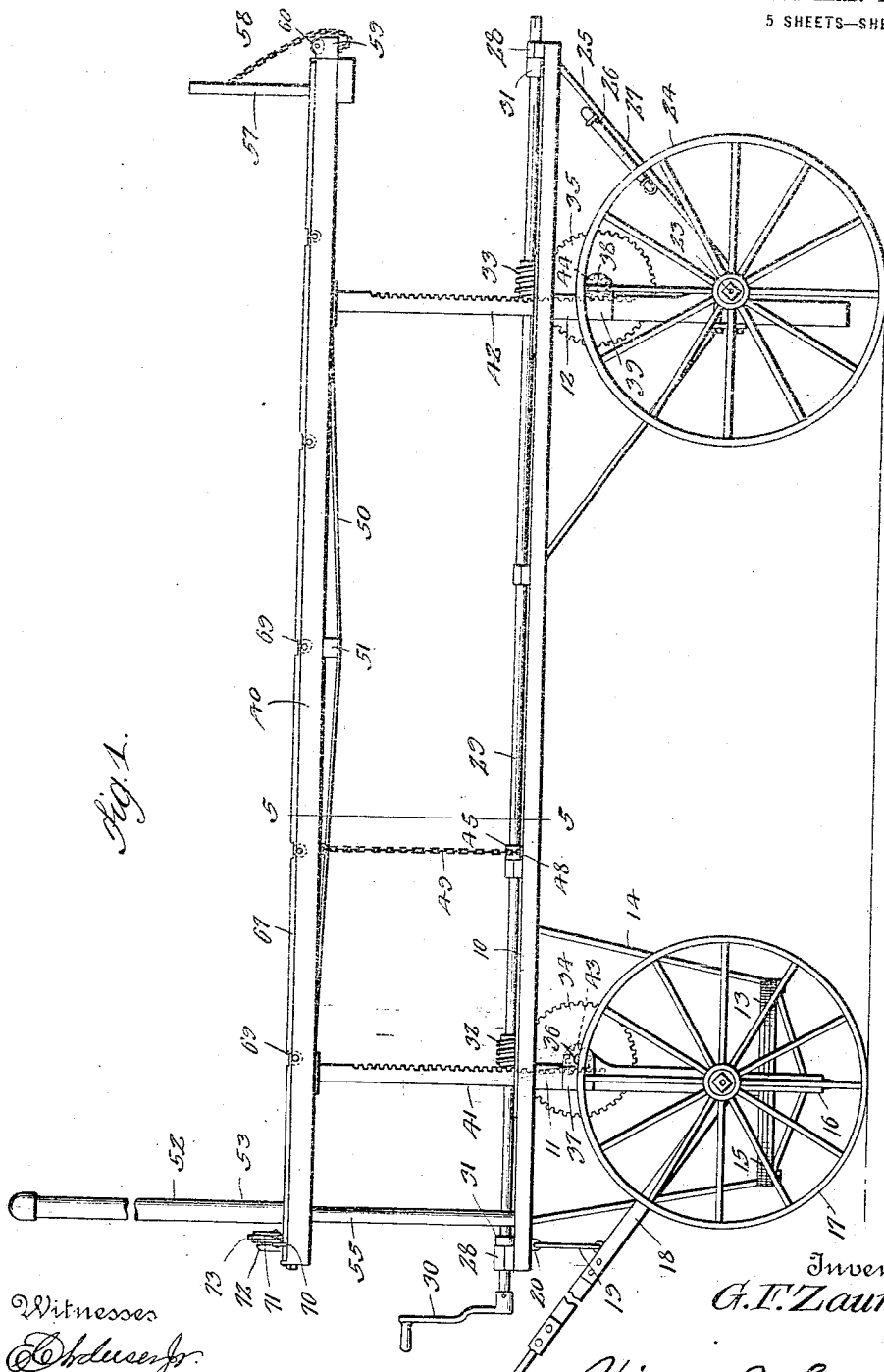
Figure 1 is a side elevation of a truck, in accordance with this invention.
Figure 2:
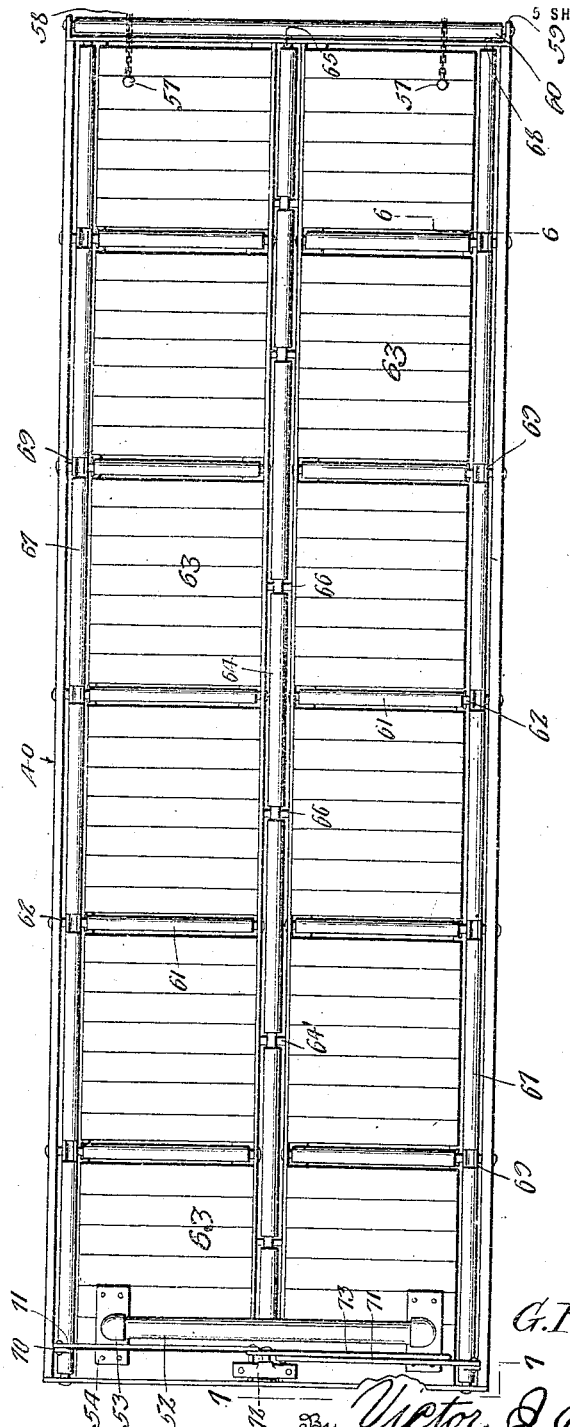
Fig. 2 is a top plan view of the same.
Figure 3:
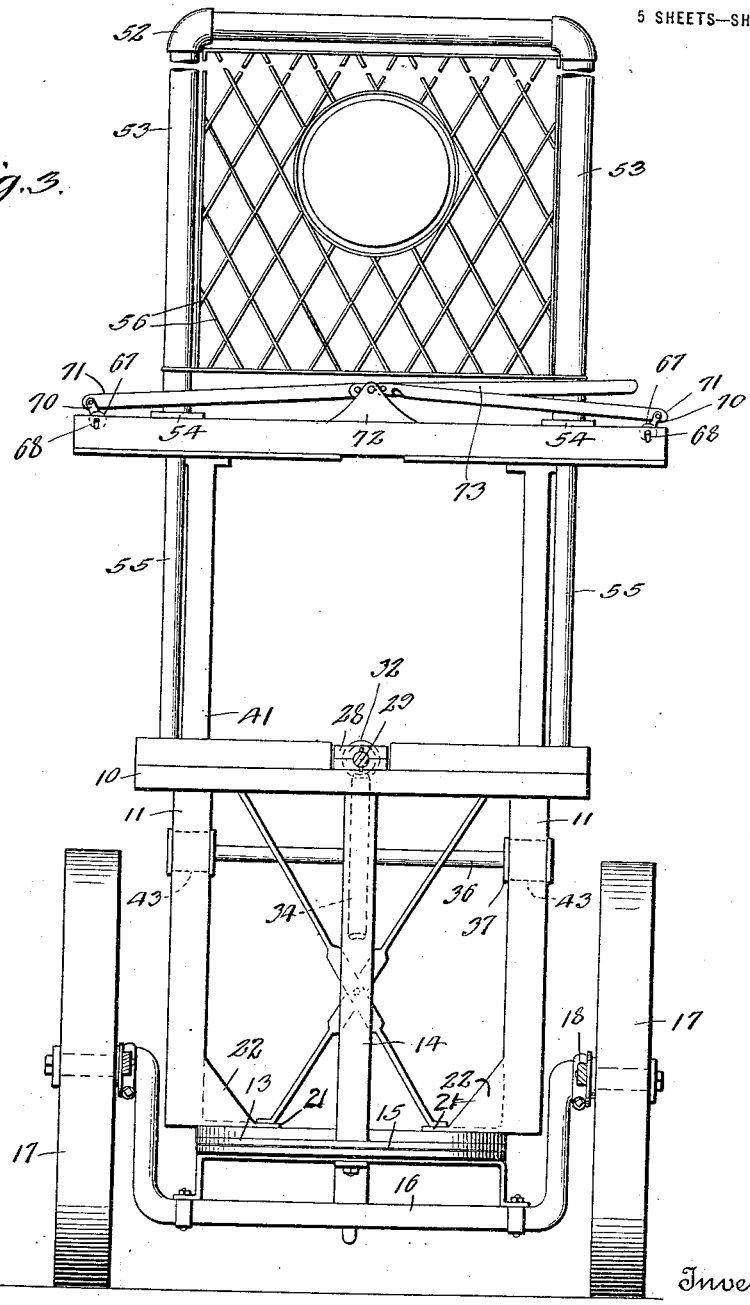
Fig. 3 is a front view of the same.
Figure 4:
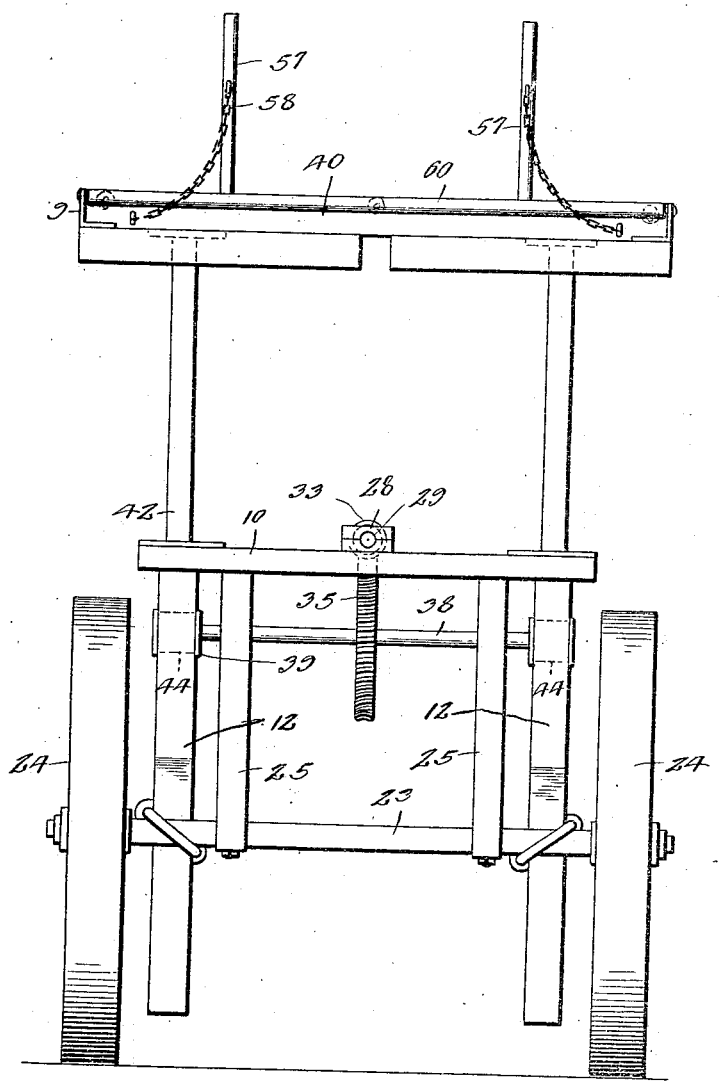
Fig. 4 is a rear end view of the same.
Figure 5:
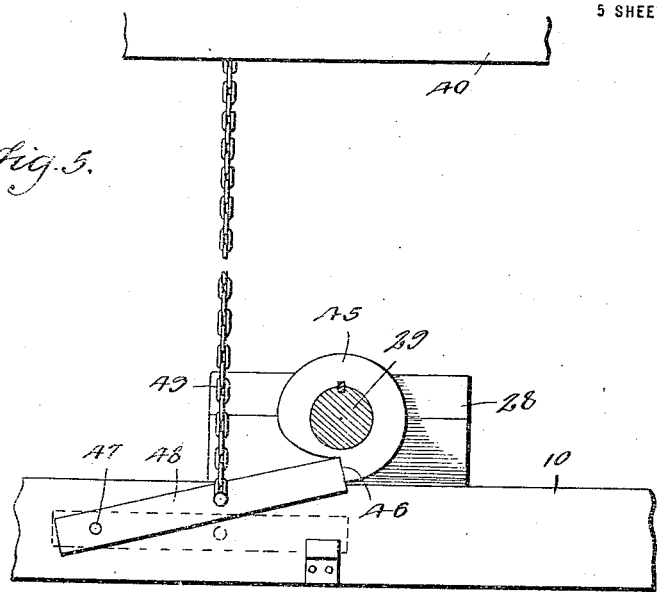
Fig. 5 is a greatly enlarged sectional view approximately on the line 5—5 of Fig. 1 illustrating the manner of locking the platform in its elevated position.
Figure 6:
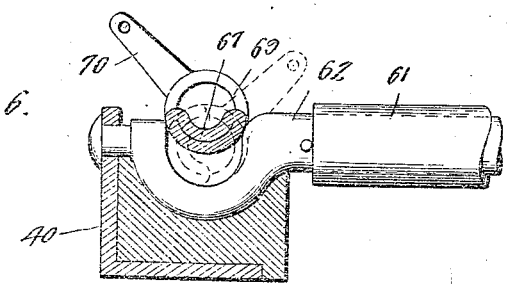
Fig. 6 is a sectional view on an enlarged scale and approximately on the line 6—6 of Fig. 2, showing the manner in which the side bars may be raised to prevent the sliding of articles over the sides of the truck.
Figure 7:
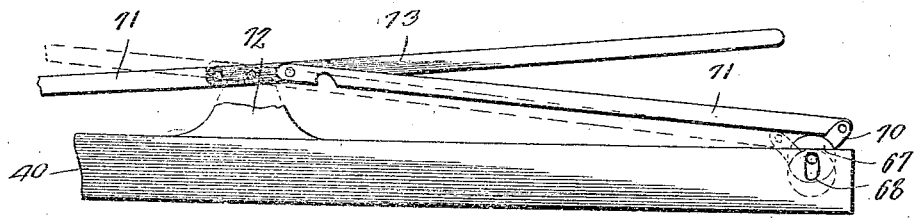
Fig. 7 is a greatly enlarged sectional view approximately on the line 7—7 of Fig. 2 illustrating the manner in which the protective side bars are actuated.

The bed of the truck is indicated by the numeral 10 and may be of wood or metal. Secured to the under face of the bed, adjacent to the ends thereof are depending sockets arranged in pairs and indicated by the numerals 11 and 12 respectively. Preferably these sockets are square or rectangular in plan, but may be of other desired shapes. The oppositely disposed alining front sockets 11 have their lower ends secured to the plate 13, the said plate being braced to the bed 10 by elements 14. The plate has centrally and pivotally connected therewith a flat disk 15. The disk 15 is in the nature of the fifth wheel and is secured to the central portion of a substantially U-shaped axle 16 for the front or steering wheels 17. To the fifth wheel 15, or if desired directly to the center-bent axle 16 is pivotally connected a handle 18, whereby the device may be manually propelled, and this handle, when not in use is held at an upward angle against the front of the device by latching a hook 19 carried by the said handle in an eye 20 which is secured to the bed 10. The sockets 11 preferably have their lower ends formed with inward flanges providing what may be termed feet 21. Reinforcing ribs 22 are arranged between the feet 21 and the inner sides of the sockets, while in addition to the brace members 14, additional cross braces may be employed to effectively stabilize the structure.

To the rear sockets 12 is secured the rear axle 23 which has journaled thereon the rear or ground wheels 24. In addition to the connection between the rear axle and the sockets 12, the said axle is additionally supported by angle brace members 25, which are secured to the under face of the bed 10 and to the axle. The brace members 25 are preferably in the nature of V-shaped elements, and the rear angular arm of one of the elements is provided with a clip or clamp 26 whereby to support a crank handle 27 when not in use, the purpose of the said crank handle will presently be apparent.

Journaled in suitable bearings 28 arranged centrally on the upper face of the bed 10 is a shaft 29. This shaft extends beyond the ends of the bed and the said ends of the shaft are preferably square or rectangular in cross section to receive the socket of the handle 27 or the socket of an additional handle 30. This last mentioned handle 30 may, if desired, be rigidly secured to the front end of the shaft as disclosed by the drawings. The shaft is provided with suitable collars 31 which being disposed opposite the bearings 28 hold the shaft against longitudinal movement. On the shaft, approximately centrally between the front and rear sockets 11 and 12 are keyed or otherwise secured worm gears 32 and 33 respectively which engage with worm wheels 34 and 35 respectively. The worm wheel 34 is secured on a shaft 36 that has its ends journaled in bearings 37 secured to the front sockets 11, while the worm 35 is keyed or otherwise secured on a shaft 38 that has its ends journaled in bearings 39 provided on the rear sockets 12. It is, of course, to be understood that the bed 10 is provided with suitable openings for the worm gears and worm wheels as well as with openings that communicate with the bore of the sockets 11 and 12.

The platform for the truck is indicated by the numeral 40 and is preferably of a length and width corresponding with that of the bed 10. The platform may be constructed of any desired material and is provided, at a suitable distance inward of its ends and sides with depending pairs of rack bars 41 and 42 respectively. The rack bars 41 are received in the sockets 11 and the rack bars 42 are received in the sockets 12. The respective rack bars are engaged by pinions 43 and 44 respectively, secured on the shafts 36 and 38 and are received in suitable openings in the sockets 11 and 12. If desired the pinions may be inclosed in suitable casings secured to the sockets for protecting the same. It will be apparent that when the shaft 29 is turned, through the medium of one of the crank handles, in one direction, the transverse shafts 36 and 38, through the medium of the worm gears and wheels will be likewise turned, revolving the pinions 43 and 44 to raise the platform 40. The platform cannot be accidentally moved regardless of the load thereon because of the toothed engagement between the worm gears and the worm wheels, but as the shaft may be accidentally turned it has been found desirable to provide means for locking the platform when the latter is in its elevated position. To accomplish this I have secured on the operating shaft 29 a cam wheel 45 provided with a single tooth or shoulder 46. Pivoted to the bed 10, as at 47 is a latch plate 48. This latch plate is connected to the platform 40 by a flexible element such as a chain 49, and the length of the chain may be adjusted by taking up the links thereof. When the platform is fully elevated the chain 49 will be drawn taut, swinging the latch plate 49 to bring the same against the shoulder 46 of the cam wheel 45, and thus positively prevent the platform being raised above a predetermined level and also prevent the accidental turning of the operating shaft 29 in one direction.

The platform 40 preferably has its sides and ends constructed of angle-irons, and its face constructed of interengaging tongued and grooved pieces. The said platform is reinforced by truss braces 50 which centrally engage the under face of the stringer 51 that is arranged centrally and transversely on the under face of the platform. The depending flanges on the sides and on the ends of the platform properly space the floor thereof above the operating shaft as well as above the worm gears and the locking means so these elements will not contact the bed when the platform is lowered.

On the platform 40, at the front end of the truck is a dash 52, the same comprising a substantially U-shaped frame made up of connected pipe members. The side pipes 53 of the dash have their lower ends provided with supporting plates or brackets 54 which are riveted or otherwise secured to the platform 40. The platform is provided with openings which aline with the bore of the side pipes 53. Secured to the bed 10 are tubular members 55 which pass through these openings and enter the bore of the side pipes 53 of the dash. These tubes steady the platform and in combination with the rack bars 41 and 42 engaging in the respective sockets 11 and 12 hold the platform firmly on the bed against movement in any direction except vertically. It is, of course, to be understood that the tubes always receive the pipe members and that the rack bars never leave the sockets. The pipe members comprising the frame of the dash may and preferably have secured therebetween a facing which, as illustrated by the drawings, is in the nature of crossed wires 56. The platform, at the rear thereof and adjacent its sides is provided with removable stakes 57. Flexible elements 58 loosely secure the stakes to the platform.

Journaled in suitable bearings 59 at the rear end of the platform is a roller 60. This roller serves to direct the packages delivered to the rear end of the platform over the said platform. The platform is provided with a plurality of spaced transversely arranged rollers 61 arranged in alining pairs. These rollers are journaled on rods or shafts 62. By this arrangement the packages delivered onto the platform may be easily moved thereover to properly position the same on the platform. Between the transverse rollers 61 the metallic frame of the platform is covered by the mentioned tongue and grooved pieces which provide the floorings 63.

The rollers 61 are held against longitudinal movement on their respective shafts 62 in any desired or preferred manner, such for instance as by the employment of pins that are passed transversely through the shafts at the ends of the rollers. This means may be also employed for properly spacing the confronting ends of the rollers from the center of the platform. Arranged between the alining rollers 61 are a plurality of alining rollers 64 which may rest on the center of the shafts 62. The longitudinally disposed series of rollers 61 are journaled on a shaft 65. Suitable bearings 66 are provided for the shaft 65. Certain of the bearings are arranged centrally between the transverse rollers 61. Spacing elements 64' for the rollers 64 are provided. By this arrangement packages may not only be conveniently moved longitudinally on the said platform, but may also be moved transversely thereof without undue physical exertion upon the part of the operator.

To prevent the articles on the platform from shifting or moving off of the same in a lateral direction, I arrange upon the sides of the platform arresting elements 67. These elements are preferably in the nature of round bars which have their ends provided with lugs forming trunnions that are journaled in bearings 68 secured to the platform at the ends thereof. Each arresting bar has one of its faces notched as at 69. These notches are arranged opposite the shafts 62 of the transverse rollers 61. The bearings 68 for the arresting bars are of a nature to permit of both a rotary and vertical movement of the said bars. When the bars are turned to one position the notches thereof will receive the shafts 62 and the bars will be lowered in their bearings. When the bars are turned to another position the rods will ride on the shafts, the notches being arranged away from the shafts. This elevates the bars above the rollers. Each of the bars 67, adjacent to the front end of the platform is provided with an outstanding ear 70. To each of these ears is loosely connected a link 71. On the front of the platform at the center thereof is secured a bracket 72. Pivoted to this bracket is a lever 73. At equal points to the opposite sides of the pivotal connection of the lever to the bracket, links 71 are pivoted to the said lever. When the lever is swung to one position, (upwardly), the links will be drawn toward the center of the platform, swinging the arresting bars to cause the same to move upwardly with respect to the platform. When the lever is lowered the notches of the arresting bars will be brought over and receive therein the shafts 62 of the transverse rollers. This brings the arresting bars to their lower position. Suitable means is provided for locking the lever 73 in either of its two positions to hold the arresting bars elevated or lowered. It is believed, from the foregoing description, when taken in connection with the drawings that the simplicity and advantages of the construction will be apparent without further description.

Having thus described the invention, what I claim is:

1. In combination, a truck, a platform on the bed thereof, elevating means therefor, a flexible element adjustably connected with said platform, and locking means influenced by said flexible element for locking the elevating means when the platform is elevated.

2. In combination, a truck, a platform on the bed thereof, a dash on one end of the platform, removable stakes on the other end of the platform, telescopic members between the platform and the truck, certain of which inter-engage with the dash, means for elevating the truck, and means for automatically locking said first mentioned means when the platform is elevated.

3. In combination, a wheeled truck, a platform on the bed thereof, telescopic elements between the platform and truck, means, comprising mechanism co-engaging with certain of said telescopic elements and adapted when actuated to raise the platform, means for locking said first mentioned means when the platform is elevated, anti-frictional elements on the platform, arresting bars on the platform, and means for elevating said arresting bars.

4. In combination, a wheeled truck, a platform on the bed thereof, telescopic elements between the platform and truck, means co-engaging with certain of said elements and designed when actuated to raise or lower the platform, automatic means for locking said first mentioned means when the platform is in its elevated position, anti-frictional rollers on the platform, arresting bars arranged longitudinally adjacent to the edges of the platform, and means for simultaneously actuating said arresting bars to raise or lower the same with respect to the platform.

5. In combination, a wheeled truck, a platform on the bed thereof, a dash, comprising a tubular frame at one end of the platform, removable stakes at the other end of the platform, members carried by the truck slidably engaging in the tubular frame of the dash, telescopic elements between the platform and truck, means upon the truck co-engaging with the telescopic elements on the platform for elevating or lowering the platform, automatic means for locking said first mentioned means when the platform is elevated, anti-frictional rollers on the platform, arresting bars on the platform, and means for simultaneously actuating said arresting bars.

6. In combination, a wheeled truck, a platform on the bed thereof, telescopic elements between the platform and the truck, means including a longitudinally arranged shaft coengaging with certain of said telescopic members and adapted to raise or lower the platform, a cam member on said shaft, a pivoted latch on the truck, an adjustable flexible element connected with the platform and with the latch and designed, when the platform is fully elevated to bring the latch into locking engagement with the cam.

7. In combination, a wheeled truck, sockets depending from the bed thereof, a platform on said bed, rack bars on said platform received in said sockets, a shaft on the bed, toothed elements on said shaft, a series of toothed elements co-acting with the toothed elements on the shaft and engaging with the rack bars whereby when the shaft is turned to raise or lower said platform, an element on the shaft, a pivoted dog on the bed, a flexible element on the platform connected with said dog and designed, when the platform is elevated to swing the dog in locking position with the last mentioned element on the shaft, and longitudinally and transversely arranged anti-frictional rollers on the bed.

8. In combination, a wheeled truck, sockets depending from the bed thereof arranged in oppositely spaced pairs, brace means between each pair of sockets, bearings on the sockets, toothed wheels having shafts journaled in said bearings, a platform on the bed, rack bars secured to the platform and entering the sockets and engaged by the referred to toothed wheels, worm wheels on the shafts of the referred to toothed wheels, a longitudinally arranged shaft on the bed, worms thereon meshing with the worm wheels, a cam member having a single tooth secured on the shaft, a pivoted dog, an adjustable flexible element between the platform and the dog designed to swing the latter to bring the same in engagement with the tooth of the cam when the platform is fully elevated, and longitudinal and transverse antifrictional rollers arranged in series on the upper face of the platform.

9. In combination, a wheeled truck, a platform on the bed thereof, telescopic elements between the platform and the bed, means engaging with certain of said telescopic elements designed to move the same vertically of the platform, when said means is actuated, to raise or lower the platform, means for locking said elevating means, a series of longitudinal and transverse rollers journaled on shafts on the upper face of the platform, notched arrester bars disposed longitudinally adjacent to the edges of the platform and journaled in bearings thereon, said arrester bars having their notches normally receiving the shafts of the transverse rollers, means for simultaneously turning said arrester bars, whereby to move the same over the referred to shafts and elevate the bars above the platform.

In testimony whereof I affix my signature.

GEORGE F. ZAUN.

Copies of this patent may be obtained for five cents each, by addressing the "Commissioner of Patents, Washington, D. C."